(12) United States Patent
Chen

(10) Patent No.: US 8,486,180 B2
(45) Date of Patent: Jul. 16, 2013

(54) PROCESS FOR THE RECOVERY OF A CONCENTRATED CARBON DIOXIDE STREAM

(75) Inventor: Yudong Chen, Garnet Valley, PA (US)

(73) Assignee: American Air Liquide, Inc., Freemont, CA (US)

( * ) Notice: Subject to any disclaimer, the term of this patent is extended or adjusted under 35 U.S.C. 154(b) by 252 days.

(21) Appl. No.: 12/971,308

(22) Filed: Dec. 17, 2010

(65) Prior Publication Data

US 2012/0090353 A1    Apr. 19, 2012

Related U.S. Application Data

(60) Provisional application No. 61/393,494, filed on Oct. 15, 2010.

(51) Int. Cl.
   *C01B 3/56*     (2006.01)
   *B01D 53/047*   (2006.01)

(52) U.S. Cl.
   USPC .................................. 95/98; 95/100; 95/139

(58) Field of Classification Search
   USPC ............... 95/96–98, 100, 103, 117, 139, 140, 95/143; 423/230
   See application file for complete search history.

(56) References Cited

U.S. PATENT DOCUMENTS

| | | | |
|---|---|---|---|
| 4,963,339 A | 10/1990 | Krishnamurthy et al. | |
| 5,000,925 A | 3/1991 | Krishnamurthy et al. | |
| 5,026,406 A * | 6/1991 | Kumar | 95/101 |
| 5,234,472 A * | 8/1993 | Krishnamurthy et al. | 95/98 |
| 6,007,606 A * | 12/1999 | Baksh et al. | 95/98 |
| 6,045,603 A * | 4/2000 | Chen et al. | 95/101 |
| 6,322,612 B1 | 11/2001 | Sircar et al. | |
| 7,740,688 B2 * | 6/2010 | Kumar | 95/100 |
| 2002/0073845 A1 | 6/2002 | Reddy | |
| 2010/0089233 A1 | 4/2010 | Pimgruber et al. | |

FOREIGN PATENT DOCUMENTS

| | | |
|---|---|---|
| EP | 0183358 | 6/1986 |
| EP | 2141119 | 1/2010 |
| WO | WO 2008/123337 A1 * | 10/2008 |

OTHER PUBLICATIONS

PCT/US2011/056370, International Search Report and Written Opinion, Dec. 13, 2011.

* cited by examiner

Primary Examiner — Frank Lawrence, Jr.

(57) ABSTRACT

A concentrated carbon dioxide stream is produced during a hydrogen pressure swing adsorption unit cycle by fractionating the carbon dioxide removed from the adsorbent in the adsorption beds during the regeneration of the adsorption beds. Thereby providing a cost efficient process for producing merchant carbon dioxide.

17 Claims, 4 Drawing Sheets

PROCESS FOR THE RECOVERY OF A CONCENTRATED CARBON DIOXIDE STREAM

CROSS-REFERENCE TO RELATED APPLICATIONS

This application claims the benefit of U.S. Provisional Application No. 61/393,494, filed Oct. 15, 2010, the entire contents of which are incorporated herein by reference.

FIELD OF THE INVENTION

The present invention relates to a process for producing a concentrated carbon dioxide stream during a hydrogen pressure swing adsorption unit cycle to be used in the production of merchant carbon dioxide.

BACKGROUND

Interest in the recovery of carbon dioxide from various carbon dioxide containing gas mixtures has increased due to a variety of factors including the merchant carbon dioxide market, enhanced oil recovery and greenhouse gas emissions reduction. The currently available systems for recovering highly concentrated carbon dioxide use a variety of physical and chemical solvents. Accordingly, the processes utilized for this type of recovery require a large investment due to equipment costs and also high regeneration energy requirements.

Carbon dioxide containing gas mixtures are produced as waste streams during the production of hydrogen gas from hydrocarbon streams using standard processes, such as steam hydrocarbon reforming processes. The most preferred of the steam hydrocarbon reforming processes involves the production of hydrogen gas from hydrocarbon streams using steam methane reforming processes since methane has a higher proportion of hydrogen than other hydrocarbons. These processes produce a mixture of carbon monoxide and hydrogen. The hydrogen yield of this mixture is often increased by passing the resulting reformed mixture through a water gas shift reactor which promotes the conversion of carbon monoxide and water into more hydrogen and accordingly a stream that is rich in hydrogen but also contains to a lesser degree carbon dioxide, methane and carbon monoxide. The hydrogen rich stream produced is then passed through a hydrogen pressure swing adsorption unit in order to allow for the removal of a large percentage (about 80% or more) of the hydrogen present through the use of adsorbents. The removal of the hydrogen results in a waste stream (also commonly referred to as "tail gas") that is removed from the hydrogen pressure swing adsorption unit and contains methane, carbon monoxide, carbon dioxide, water, and any unrecovered hydrogen. This tail gas stream is the result of the regeneration of the adsorbent bed (the removal of the various components that have adsorbed to the adsorbent of the adsorbents beds in order to allow for further use of the bed to produce hydrogen product). Regeneration is accomplished in the desorption/purging parts of the hydrogen pressure swing adsorption process. There has been a drive to utilize these tail gas streams more efficiently as in the past they have often simply been burned as make up fuel in the steam hydrocarbon reforming process.

There is a growing desire to be able to withdraw the carbon dioxide from such tail gases in a cost efficient manner thereby allowing for the use of such tail gases for purposes other than as a make up fuel for steam hydrocarbon reforming processes. This is especially true with regard to small merchant carbon dioxide plants where conventional carbon dioxide sources are typically not available locally. Current attempts at this involve withdrawing the tail gas stream from the hydrogen pressure swing adsorption unit and then further treating the stream to minimize the remaining components such as methane, carbon monoxide, water and unrecovered hydrogen in the stream. Typically, the tail gas stream obtained from the hydrogen pressure swing adsorption process contains from about 40 to about 50% carbon dioxide. In most instances, the tail gas stream obtained from the hydrogen pressure swing adsorption process contains about 47% carbon dioxide. Accordingly, with a tail gas that contains this amount of carbon dioxide, it becomes difficult and expensive to use some of the currently available technologies such as cryogenic purification systems to produce high purity food/beverage grade carbon dioxide for merchant product. In such a case as cryogenic purification, very high compression and cold temperature requirements are needed to further separate the carbon dioxide from the other gases. As a result, it becomes necessary to first concentrate the carbon dioxide in such gas streams before carbon dioxide liquefaction takes place to generate a high purity carbon dioxide product. However, the costs associated with concentrating the carbon dioxide prior to liquefying the carbon dioxide can be high and the process itself can prove to not be very efficient when the feed mixture contains a lower concentration of carbon dioxide. A number of processes for removing carbon dioxide exist in the art, such as for example, the adsorption process proposed by the BOC Group in U.S. Pat. No. 4,963,339 and U.S. Pat. No. 5,000,925 wherein the carbon dioxide is enriched using a carbon dioxide pressure swing adsorption unit. In these processes, a two stage process was used to produce food grade carbon dioxide from a hydrogen pressure swing adsorption tail stream with the first stage being a carbon dioxide vacuum swing adsorption or pressure swing adsorption process followed by a second stage which was a standard carbon dioxide liquefaction plant. Even so, the addition of a carbon dioxide vacuum swing adsorption or a pressure swing adsorption unit is less efficient.

Accordingly, it is the object of the present invention to provide a process for obtaining a concentrated, cost efficient carbon dioxide stream from a hydrogen pressure swing adsorption tail gas which can be sent directly to a carbon dioxide pressure swing adsorption unit or a cryogenic purification system for recovery/liquification of the carbon dioxide more effectively.

SUMMARY OF THE INVENTION

The present invention provides a process for producing a concentrated carbon dioxide stream during a hydrogen pressure swing adsorption unit cycle by fractionating the carbon dioxide removed from the adsorbent in the adsorption beds during the regeneration of the adsorption beds. The present invention further relates to a cost efficient process for producing merchant carbon dioxide utilizing the concentrated carbon dioxide stream obtained during a hydrogen pressure swing adsorption unit cycle. The present invention further relates to a system for carrying out the present invention.

DETAILED DESCRIPTION OF THE INVENTION

Figure 1:
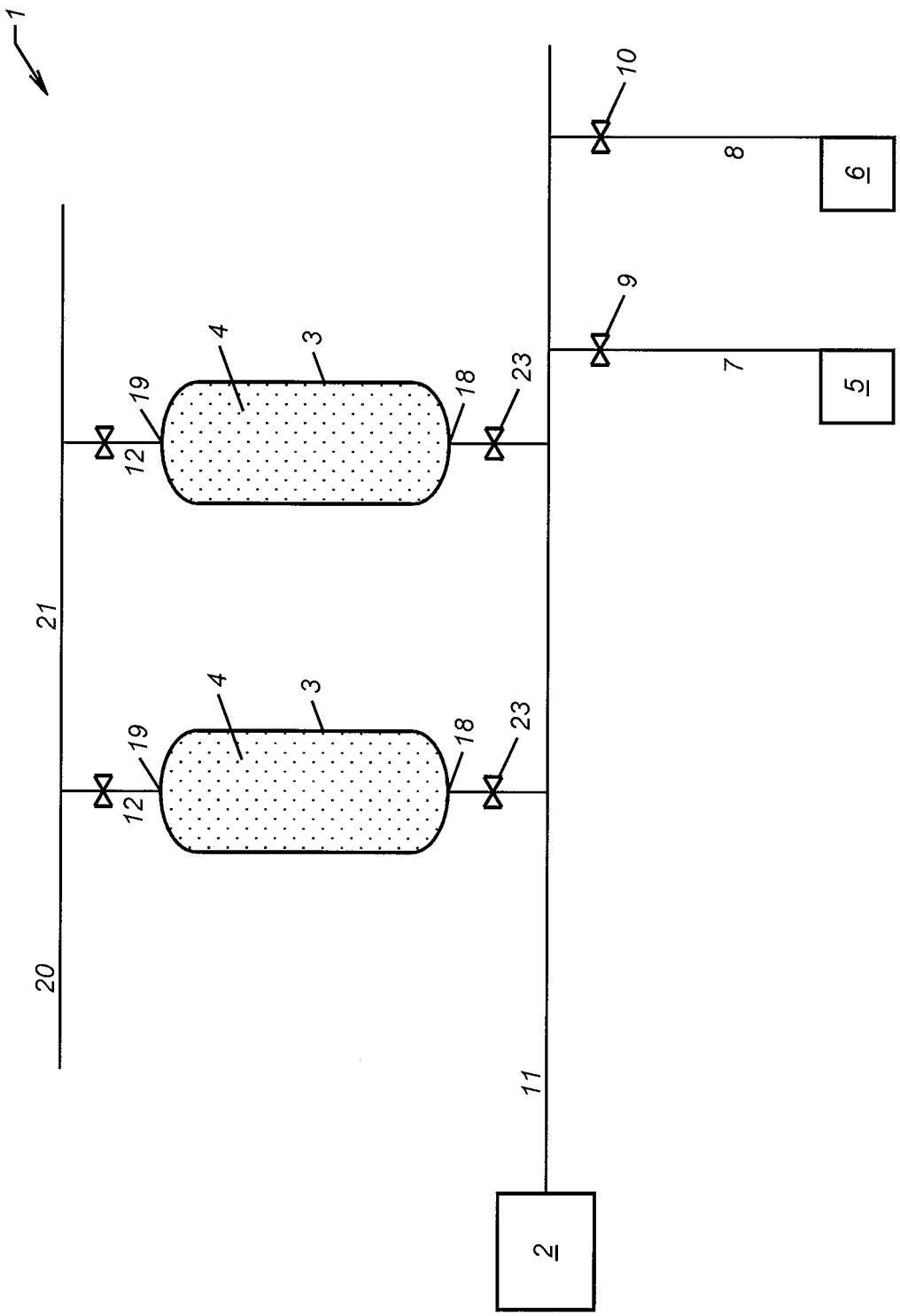
FIG. 1 provides a schematic of the present invention which includes a hydrogen pressure swing adsorption unit in combination with two desorbing tanks.

The present invention relates to a process for recovering a concentrated carbon dioxide stream during a hydrogen pressure swing adsorption unit cycle that can be used in a cost efficient manner to produce merchant carbon dioxide. More specifically, the present invention is concerned with maximizing the concentration of the carbon dioxide withdrawn as a part of the hydrogen pressure swing adsorption tail gas in order to minimize or eliminate the need for further treatment of this portion of the tail gas prior to this portion being subjected to cryogenic purification or a carbon dioxide pressure swing adsorption process. By carrying out the process of the present invention in the manner noted, the concentration of the carbon dioxide recovered as a first fraction of the tail gas is maximized such that the concentration of the carbon dioxide in this fraction increases from around 47 mole % (quantity obtained using the conventional hydrogen pressure swing adsorption process) to from about 60 mole % to about 75 mole %, typically from about 63 mole % to about 72 mole %, and even more typically from about 65 mole % to about 70 mole %, obtained using the process of the present invention. In other words, by using the process of the present invention, it is possible to achieve an increase in carbon dioxide concentration of from approximately a 30% to approximately 50% over the concentration achieved using conventional processes.

This increase is accomplished by withdrawing the tail gas as two separate fractions—one fraction that results from isolating the carbon dioxide desorbed from the adsorbent in the adsorbent bed and one fraction that results from displacing the remaining carbon dioxide from the adsorbent bed during the purge of the adsorbent in the adsorbent bed. The fraction that results from isolating the desorbed carbon dioxide is much higher in concentration than the fraction that results from the purge of the adsorbent. Accordingly, as used herein, the phrase "concentrated carbon dioxide stream" or similar wording with regard to the fraction that results from isolating the desorbed carbon dioxide refers to a fraction that comprises greater than 60 mole % carbon dioxide, preferably greater than 65 mole % carbon dioxide, even more preferably, greater than 70 mole % carbon dioxide.

The overall process of the present invention involves recovering carbon dioxide from the tail gas of the hydrogen pressure swing adsorption unit as a concentrated fraction of the tail gas (recovering the carbon dioxide in a stream that is much easier to treat in order to obtain a product that meets merchant carbon dioxide requirements). As used throughout with regard to the present invention, the phrase "merchant carbon dioxide" refers to a carbon dioxide stream which is considered to be of food/beverage grade with regard to the purity of the carbon dioxide in the stream. Typically, the merchant carbon dioxide stream obtained will contain at least 95 mole % carbon dioxide, preferably greater than 97 mole % carbon dioxide, and even more preferably greater than 99 mole % carbon dioxide. By using the process of the present invention, it is possible to achieve a fraction that contains at least 60 mole % carbon dioxide. More specifically, by using the process of the present invention, it is possible to withdraw from about 30% to about 60%, preferably around about 45% of the total carbon dioxide in the tail gas as a concentrated carbon dioxide rich fraction. Because of the higher concentration of carbon dioxide, it is possible to improve efficiency of the downstream carbon dioxide recovery process as the conversion of this fraction into a merchant carbon dioxide stream will occur in a more efficient, cost effective manner. The remaining percentage of the carbon dioxide will then pass through as the second fraction—the carbon dioxide lean fraction.

The process of the present invention will be further described with regard to the figures herein. However, these figures are included merely for illustration purposes and are not intended in any way to limit the process of the present invention. With reference to FIG. 1, the process of the present invention involves fractionating the carbon dioxide containing tail gas produced during regeneration of adsorbent 4 in an adsorption bed 3 of a hydrogen pressure swing adsorption unit 1 cycle. This fractionating is accomplished by countercurrently depressurizing the adsorption bed 3 to desorb a portion of the carbon dioxide adsorbed to the adsorbent 4 of the adsorption bed 3 thereby forming a carbon dioxide rich fraction which is then withdrawn from the adsorption bed 3 and passed to a first desorption tank 5. This step is followed by purging the adsorption bed 3 to allow for displacement of any residual carbon dioxide from the one or more adsorbents 4 thereby forming a carbon dioxide lean fraction which is withdrawn from the purged adsorption bed 3 and passed to the second desorption tank 6. As a result, a carbon dioxide rich fraction which contains greater than 60 mole % carbon dioxide is isolated and available for further use and/or purification.

In an alternative embodiment, the process of the present invention involves as a first step providing a hydrogen pressure swing adsorption unit 1 for the treatment of one or more hydrogen rich feed streams from a source 2 as depicted in FIG. 1. The one or more hydrogen rich feed streams from the source 2 can be any hydrogen rich feed stream that can be subjected to hydrogen pressure swing adsorption treatment. The feed streams to be subjected to hydrogen pressure swing adsorption typically comprise a mixture of hydrogen and carbon monoxide as well as other components that are frequently found in such feed streams such as carbon dioxide, hydrogen sulfide, methane, etc. In the process of the present invention, the hydrogen rich feed streams are produced from hydrocarbon feed in any variety of manners including, but not limited to, by coal gasification, by steam hydrocarbon reforming, by autothermal reforming or by partial oxidation so that they will be better suited for hydrogen pressure swing adsorption. Accordingly, such streams may be obtained in whole or in part from the treatment of hydrocarbon feed stock such as crude oil, coal or natural gas in a coal gasification unit, a steam hydrocarbon reforming unit, an autothermal reforming unit or a partial oxidation unit.

The hydrogen pressure swing adsorption unit 1 utilized in the present invention is a standard hydrogen pressure swing adsorption unit 1 that is known in the art and meets the following criteria: (a) contains at least two adsorption beds; (b) each of the adsorption beds is capable of being run on a cycle that includes the phases of (1) adsorption, (2) co-current depressurization, (3) countercurrent depressurization, (4) purge at low pressure, and (5) repressurization; (c) the adsorption beds operate continuously and in a staggered scheme; and (d) each of the adsorption beds includes one or more adsorbents for carbon dioxide and components such as carbon monoxide, methane, and trace amounts of water. In addition, for purposes of the present process, the hydrogen pressure swing adsorption unit 1 also contains two desorption tanks 5, 6.

The hydrogen pressure swing adsorption unit 1 utilized should comprise at least two adsorption beds 3. Typically, the hydrogen pressure swing adsorption unit 1 will comprise anywhere from two to twelve adsorption beds 3 although more adsorption beds 3 have been known to be utilized based on the size of the facility and the throughput of hydrogen rich feed streams to be treated. With regard to the adsorption beds 3, the type of adsorbents 4 utilized may be any type of adsorbent 4 that is known in the art that is capable of specifically targeting carbon dioxide while at the same time allowing for the targeting of the other components in the hydrogen rich feed streams such as carbon monoxide, methane, and trace amounts of water in the hydrogen pressure swing adsorption unit 1 adsorption beds 3. Examples of such adsorbents 4 contemplated to be used in the hydrogen pressure swing adsorption unit 1 of the present invention include, but are not limited to, activated alumina, activated carbon, zeolites and combinations thereof although other adsorbents, or combinations thereof, may be utilized or combined with the noted adsorbents. Note however, that the method of the present invention is not meant to be limited with regard to a specific configuration of the hydrogen pressure swing adsorption unit 1 (with the exception of the two desorption tanks). Accordingly, any hydrogen pressure swing adsorption unit 1 known in the art that meets the above criteria may be used in the process of the present invention. By way of general description, such hydrogen pressure swing adsorption units 1 typically contain two or more adsorption beds 3, each packed with one or more adsorbents 4, through which the hydrogen rich feed streams from the source 2 passes. As used throughout with regard to the present invention, the phrase "hydrogen pressure swing adsorption unit" refers not only to the actual adsorption beds 3, but also to the additional components (not shown) that typically are considered to make up a hydrogen pressure swing adsorption unit 1.

The second step of the process of the present invention involves providing a first desorption tank 5 and a second desorption tank 6 to complete the hydrogen pressure swing adsorption unit 1 of the present invention. The desorption tanks 5, 6 utilized will typically be tanks which have a narrow diameter compared to the height of the tank. The shape of such tanks is generally determined by the space constraints that exist in most plants. The tanks 5, 6 will generally be of the type that are commonly used in the holding of the prior art tail gas (conventional tail gas produced without fractionating) with the exception that in many instances one or more of the two separate tanks 5, 6 can be smaller in size than the one prior tank typically utilized. Note that in many instances the present invention will be put into an already existing facility. Accordingly, in such cases, it is possible to achieve the present process by simply adding one additional tank. In such an instance, it is likely that the original tank in place will be utilized as the first desorbing tank 5 and the new tank, which can be the same size but due to space constraints will likely be somewhat smaller in size, will function as the second desorption tank 6. With regard to the present invention, the size of each of the tanks will likely be determined by the space available as well as how much hydrogen rich feed stream is being processed. Those of ordinary skill in the art will recognize that such determinations must be in the equipping of the facility.

Each of these tanks 5, 6 is connected to each of the adsorption beds 3 via one or more corresponding lines 7, 8, with each line 7, 8 having a valve 9, 10 disposed thereon. Also, each tank 5, 6 is preferably connected independently to the one or more adsorption beds 3. Each of the desorption tanks 5, 6 utilized will correspond to one of the fractions removed during the hydrogen pressure swing adsorption cycle in the present process—a carbon dioxide rich desorbed stream to the first desorption tank 5 and a carbon dioxide lean desorbed stream to the second desorption tank 6. These types of tanks 5, 6 are known and utilized in the art and are commercially available.

Figure 2:
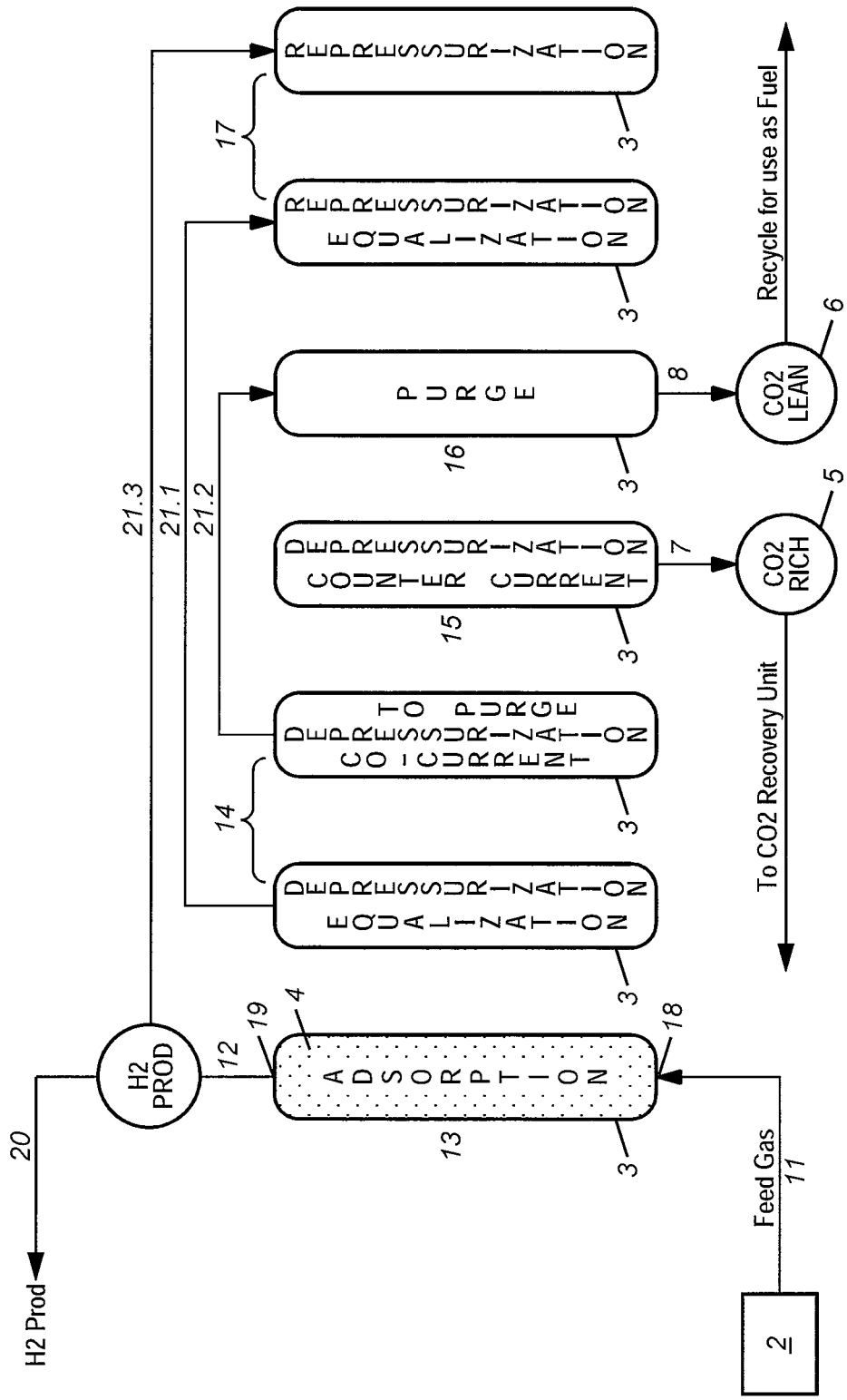
FIG. 2 provides a flowchart of the various phases encountered by an adsorption bed during the hydrogen pressure swing adsorption cycle.

With regard to the actual cycle within the hydrogen pressure swing adsorption unit 1 as depicted in FIG. 2, one or more hydrogen rich feed streams will be introduced from a source 2 into the adsorption beds 3 of the hydrogen pressure swing adsorption unit 1 via an input line 11 that feeds the hydrogen rich feed stream into the flow reversible first conduit 18 of the adsorption beds 3. As a result of processing the hydrogen rich feed stream in the hydrogen pressure swing adsorption unit 1, hydrogen that is of a high purity is produced and withdrawn via line 12 and sent on to further use via line 20.

The one or more hydrogen rich feed streams to be introduced into the hydrogen pressure swing adsorption unit 1, will typically be introduced at a temperature of less than about 100° C., preferably from about 30° C. to about 75° C., and even more preferably at a temperature from about 30° C. to about 50° C., and a pressure in the range of from about 200 to about 600 psig, preferably from about 250 psig to about 425 psig.

In addition, while the facility may include from two to twelve adsorption beds 3, not all of these adsorption beds 3 have to be in use at once. Accordingly, one or more of the adsorption beds 3 in the hydrogen pressure swing adsorption unit 1 may be dormant. However, at least two of the adsorption beds 3 must be in continuous use with regard to one another during the hydrogen pressure swing adsorption cycle. As used herein, the phrase "continuous use" refers to the use of the two beds in the pressure swing adsorption cycle at the same time. Furthermore, with regard to the two or more adsorption beds 3 in use, at least one of these adsorption beds 3 is staggered with regard to the other adsorption beds 3 concerning their point in the process cycle (at least one bed is at a different phase in the cycle compared to at least one of the other beds) in order to allow continuous uninterrupted processing in the hydrogen pressure swing adsorption unit 1.

In the process of the present invention, the carbon dioxide is removed from the adsorbent 4 as two separate fractions, one fraction that is a carbon dioxide rich fraction and one fraction that is a carbon dioxide lean fraction. As used herein, the phrase "carbon dioxide rich fraction" refers to that fraction of the tail gas that is desorbed during the counter current depressurization phase 15 to produce a fraction that is more concentrated in carbon dioxide than the traditional tail gas concentration (a concentration that has greater than 60 mole % carbon dioxide, preferably from about 60 mole % to about 75 mole %, compared to approximately 47 mole % carbon dioxide of the conventional tail gases). When this concentration is 70 mole % or greater, the fraction obtained can be directed straight to a cryogenic purification unit for production of a merchant carbon dioxide product without the necessity of pretreatment before being injected into the cryogenic purification unit. When the concentration of the carbon dioxide in the first fraction (the carbon dioxide rich fraction) is less than 70 mole %, preferably this fraction is further treated by carbon dioxide pressure swing adsorption before being subjected to cryogenic purification to produce a carbon dioxide stream that meets the merchant carbon dioxide conditions— has greater than 95 mole % carbon dioxide as described hereinbefore. In each of these cases, because of the increased concentration in the stream recovered from the hydrogen pressure swing adsorption unit 1, it is possible to produce the merchant carbon dioxide with less power consumption and effort.

Furthermore, as used herein, the phrase "carbon dioxide lean fraction" refers to the remaining portion of the tail gas that exists after the removal of the carbon dioxide rich fraction and during the purge phase 16 of the adsorbent bed 3. This is accomplished by splitting the traditional product obtained from the countercurrent depressurization phase 15 and purge phase 16 of the adsorption bed 3 into two fractions, one fraction which corresponds to the counter-current depressurization phase 15 of the adsorption bed 3 and one fraction that corresponds to the purge phase 16 of the adsorption bed 3.

Typically, hydrogen pressure swing adsorption tail gas is withdrawn from an adsorption bed 3 of the hydrogen pressure swing adsorption unit 1 as a single stream that is obtained during the counter current depressurization 15 and purge 16 phases. As noted above with regard to conventional processes, this single stream generally comprises carbon dioxide (typically around 47 mole %), methane and carbon monoxide, any hydrogen which did not pass from the adsorbent bed, and trace amounts of water. Once the adsorbent in the adsorption bed 3 is near or approaching saturation or the purity of the hydrogen stream being withdrawn from the adsorption bed 3 (via line 12 in FIG. 1) begins to decrease, the feed flow to adsorption bed 3 is stopped, Normally, in order to continue to utilize the adsorption bed 3, it is then necessary to remove the target components that have adsorbed to the adsorbents 4 in the adsorption bed 3 otherwise the efficiency of the adsorption bed 3 will begin to decrease. As noted, these adsorbed components make up what is commonly referred to as the tail gas of the hydrogen pressure swing adsorption cycle.

As shown in FIG. 2, each adsorption bed 3 of the hydrogen pressure swing adsorption cycle goes through a variety of phases. These phases include an adsorption phase 13, a co-current depressurization phase 14 (which includes equalization depressurization and co-current depressurization to purge), a counter current depressurization phase 15, a purge at low pressure phase 16, and a repressurization phase 17 (which includes equalization repressurization and finishing repressurization).

The first phase of the hydrogen pressure swing adsorption cycle of the present process is the adsorption phase 13. As in traditional hydrogen pressure swing adsorption processes, the hydrogen rich feed stream is passed over the adsorption bed 3 and the target components within the hydrogen rich feed stream are adsorbed to the adsorbent 4 in the adsorption bed 3 while the hydrogen passes on through the bed. As a result of the typical hydrogen pressure swing adsorption cycle within the adsorption bed 3, a gaseous high purity hydrogen stream (which is not the target of the adsorbents 4 and therefore passes through the adsorption beds) is produced and withdrawn from an adsorption bed flow reversible second conduit 19 via line 12. This high purity hydrogen stream is passed on for further use and/or storage via line 20. The remaining components (carbon dioxide, carbon monoxide, methane and possibly some remaining hydrogen) which have adsorbed either specifically or non-specifically to the adsorbent 4, are the components which make up the "tail gas" in traditional processes. As noted previously, in traditional processes, all of the components are removed and the resulting tail gas is further treated to isolate the carbon dioxide using conventional methods known to those skilled in the art.

According to the present process, the first fraction, which is the carbon dioxide rich fraction, is obtained during the counter-current depressurization phase 15 of the hydrogen pressure swing adsorption cycle. Prior to this phase 15, the adsorption bed 3 enters the co-current depressurization phase 14 of the hydrogen pressure swing adsorption unit 1 cycle once the adsorbent 4 in the adsorption bed 3 begins to near saturation (begins to approach its capacity) at the end of adsorption phase 13.

As shown in FIG. 2, the co-current depressurization phase 14 of the hydrogen pressure swing adsorption cycle is characterized by multiple actions. First, the depressurization of the adsorption bed 3 is commenced and the adsorption bed 3 is allowed to near equalization in pressure with regard to another adsorption bed 3 that is in the repressurization phase 17. Note that while the equalization is depicted as one step in FIG. 2, it is not uncommon for multiple bed pressure swing adsorption units to have more than one equalization step such that the first co-current depressurization stream is to equalize with the last step of the repressurization phase before the final backfill step which used the hydrogen product to repressurize the bed. This is accomplished by allowing communication between the two adsorption beds 3 through line 21. The various adsorption beds 3 of the hydrogen pressure swing adsorption unit 1 are connected to one another via a variety of lines and valves (lines shown in FIG. 1 as lines 11 and 21 with the valves not shown and lines shown in FIG. 2 as lines 21.1, 21.2 and 21.3 with the valves not shown) located along the top of each of the adsorption beds 3. Note that the present invention is not meant to be limited by the lines and valves as depicted, such lines and valves are merely included for purposes of illustration. With regard to the co-current depressurization phase 14, a series of valves (not shown) on line 21 allow for interaction between the adsorption beds 3 in the hydrogen pressure swing adsorption unit 1. Note that at the beginning of the co-current depressurization phase 14 (at the end of the adsorption phase 13), the adsorption bed 3 is at a pressure in the range of from about 200 to about 600 psig (as this was the initiation pressure of the hydrogen rich feed stream that is injected into the adsorption bed 3). As used herein, the phrase "equalize" or "equalization" refers to the nearly equal pressure (within a similar range) that the two adsorption beds 3 reach when the communication is allowed between the two adsorption beds 3 (the one that is near capacity and the one that is in the repressurization phase 17). Those of ordinary skill in the art will recognize that when communication is allowed between the two adsorption beds 3, that exact equalization between the two adsorption beds will not be reached but that the pressure range within the two beds will be approaching one another ($\Delta P$); considered to be nearly equal or similar to one another in terms or pressure range.

With regard to the equalization in the depressurization phase 14, the adsorption bed 3 which is at a high pressure (between 200 and 600 psig) is connected with the adsorption bed 3 which is in the re-pressurization phase 17 (in FIG. 2 depicted as the first step in the re-pressurization phase) and is at near ambient pressure. The corresponding valves (not shown) between the two beds 3 on line 21 (in FIG. 1) are opened and as a result, a depressurization effluent stream passes from the adsorption bed 3 that is in the step of the depressurization phase 14 to the adsorption bed 3 that is in the repressurization phase 17 along line 21.1 and the pressure in the adsorption bed 3 that is in the step of the depressurization phase 14 begins to drop and the pressure in the adsorption bed 3 that is in the repressurization phase 17 begins to increase. As a result of the communication between these two adsorption beds 3 as shown in FIG. 2, the pressure between the two adsorption beds 3 reaches a point that is considered to be near equalization. Once near equalization of the two beds 3 is reached, the equalized adsorption bed 3 then enters the second part of the co-current depressurization phase 14. In this second part, further depressurization of the equalized adsorption bed 3 is achieved by opening/closing corresponding valves (not shown) along line 21.2 which connect the equalized bed 3 with a bed 3 that is in the purge phase 16 and further opening the valves associated with the lower end of the adsorption bed (valve 23), the second desorption tank 6 (valve 10 on line 8) and line 11 (valves not shown) all as shown in FIG. 1 thereby using the effluent from the equalized bed 3 to purge the bed 3 in the purge phase 16. As a result, the adsorption bed 3 (the equalized bed 3) is now considered to be a reduced adsorption bed 3. The effluent that flows from the bed that is in the purge phase 16 is considered to be the carbon dioxide lean fraction as described hereinbelow.

Once the adsorption bed 3 is depressurized, the reduced adsorption bed 3 enters into the counter-current depressurizing phase 15 of the hydrogen pressure swing adsorption cycle. At this phase, the reduced adsorption bed 3 is further reduced to a pressure that ranges from about ambient to about 15 psig in order to desorb the carbon dioxide that is adsorbed to the adsorbent 4. As a result, a carbon dioxide rich fraction is obtained. This is accomplished by closing the corresponding valves (not shown) on line 21 and opening valves 23 and 9 on line 7 (as shown in FIG. 1) thereby allowing for the carbon dioxide rich fraction that results from the decrease in pressure to be withdrawn via flow reversible first conduit 18 of the adsorption bed 3 and passed via line 7 to the first desorption tank 5. Note that while the objective is to desorb the carbon dioxide present, those of ordinary skill in the art will recognize that a small portion of the remaining components which are adsorbed (either specifically or non-specifically) may also result. As used herein with regard to the present process, the phrase "small portion of the remaining components" refers to an amount which comprises from about 25 mole % to about 40 mole % of the remaining components being in the final carbon dioxide rich desorbed stream. More specifically, as described hereinbefore, the carbon dioxide rich desorbed stream will comprise greater than about 60 mole % carbon dioxide, most likely from about 60 mole % carbon dioxide to about 75 mole % carbon dioxide. As a result of this desorption, a carbon dioxide desorbed adsorption bed 3 is formed. Depending upon the amount of carbon dioxide in the carbon dioxide rich fraction, the desorbed fraction that is sent to the first desorption tank 5 can be sent directly to a cryogenic purification unit (when the percentage of carbon dioxide is 70 mole % or greater) or pretreated to further concentrate the carbon dioxide in the stream before being sent to a cryogenic purification unit.

The next phase of the adsorbent bed 3 in the hydrogen pressure swing adsorption cycle is the purge phase 16 at low pressure. During the purge phase 16, the carbon dioxide desorbed adsorption bed 3 is purged using the depressurization effluent stream from the co-current depressurization phase 14 as described hereinbefore to allow for the displacement of the residual carbon dioxide and the remaining components from the one or more adsorbents 4 to form a carbon dioxide lean desorbed stream. This stream is withdrawn via flow reversible first conduit 18 and passed to the second desorption tank 6 via line 8. The carbon dioxide lean fraction from the second desorption tank 6 is utilized as a recycle stream. Those skilled in the art will recognize that this stream can be recycled for further use as make up fuel in any number of processes.

Once the purge phase 16 is completed, the adsorption bed 3 then enters the first part of the repressurization phase 17 by equalizing the adsorption bed 3 utilizing the effluent from the step of the depressurization phase 14 as described hereinbefore and then further repressurizing the adsorption bed 3 to the level necessary for the adsorption phase 13 using a portion of the high purity hydrogen product stream obtained during the adsorption phase via line 21.3. As noted above, the equalization may be accomplished in multiple steps. At this point, the adsorbent bed 3 is ready to enter the hydrogen pressure swing adsorption cycle once again by commencing with the adsorption phase 13.

Figure 3:
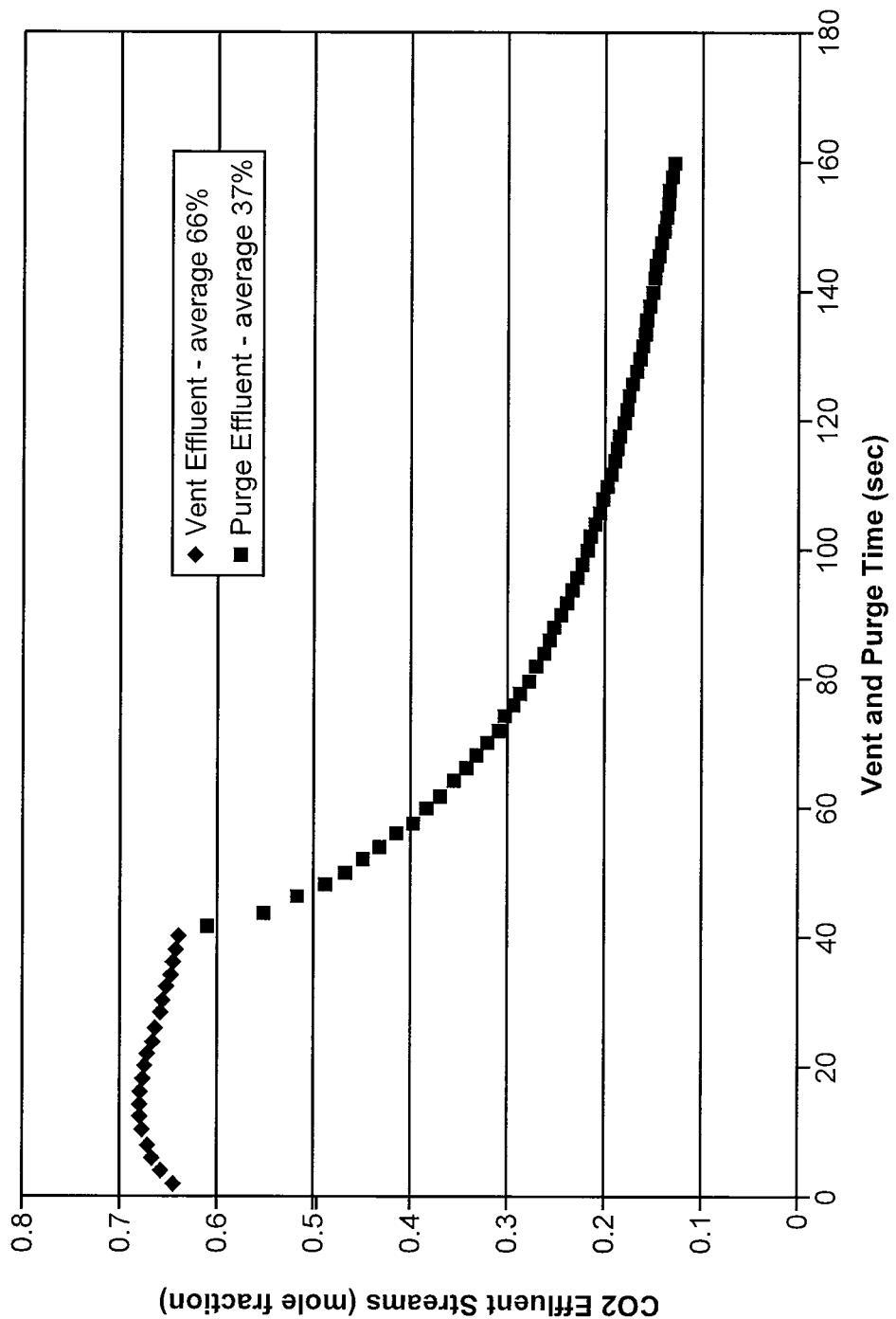
FIG. 3 provides an illustration of the carbon dioxide fluid streams (the carbon dioxide rich fraction and the carbon dioxide lean fraction) during the counter current depressurization and purge phases of the hydrogen pressure swing adsorption cycle of the present invention.

As shown in the simulation set forth in FIG. 3 carried out using a commercially available software by Aspen Technology (Aspen Adsorption) by using the process of the present invention, on average, it is possible to obtain a carbon dioxide stream from the hydrogen pressure swing adsorption process in which the concentration of the carbon dioxide has increased from approximately 47 mole % as obtained by conventional processes to an average of 66 mole % with the process of the present invention. This is possible due to the isolation of the desorbed carbon dioxide prior to the dilution of the remaining carbon dioxide that is displaced during the purge phase of the process (the point where the remaining carbon dioxide that is adsorbed to the adsorbent is replaced with hydrogen due to purge conditions). Accordingly, as shown in this simulation, the highest carbon dioxide (mole fraction) is obtained during the first forty seconds as in this simulation this corresponds to the counter current depressurization phase 15. As can be seen from the simulation, the mole fraction of carbon dioxide drops off considerably over the next one hundred and twenty seconds as this corresponds to the purge phase 16 of the process where the carbon dioxide is being displaced/diluted out by the purge stream of hydrogen. The carbon dioxide rich fraction obtained is then further treated to produce beverage/food grade carbon dioxide product. By using the process of the present invention, it is possible to produce merchant carbon dioxide in plants where conventional carbon dioxide sources are not available locally.

The process described herein can be utilized in conjunction with a variety of different operations such as steam hydrocarbon reforming, coal gasification, autothermal reforming or partial oxidation. Accordingly, hydrogen rich feed streams obtained in whole or in part from the treatment of hydrocarbon feed stock such as crude oil, coal or natural gas in a coal gasification unit, a steam hydrocarbon reforming unit, an autothermal reforming unit or a partial oxidation unit can be further treated utilizing the process of the present invention in a hydrogen pressure swing adsorption unit that includes two desorption tanks as described hereinbefore.

Figure 4:
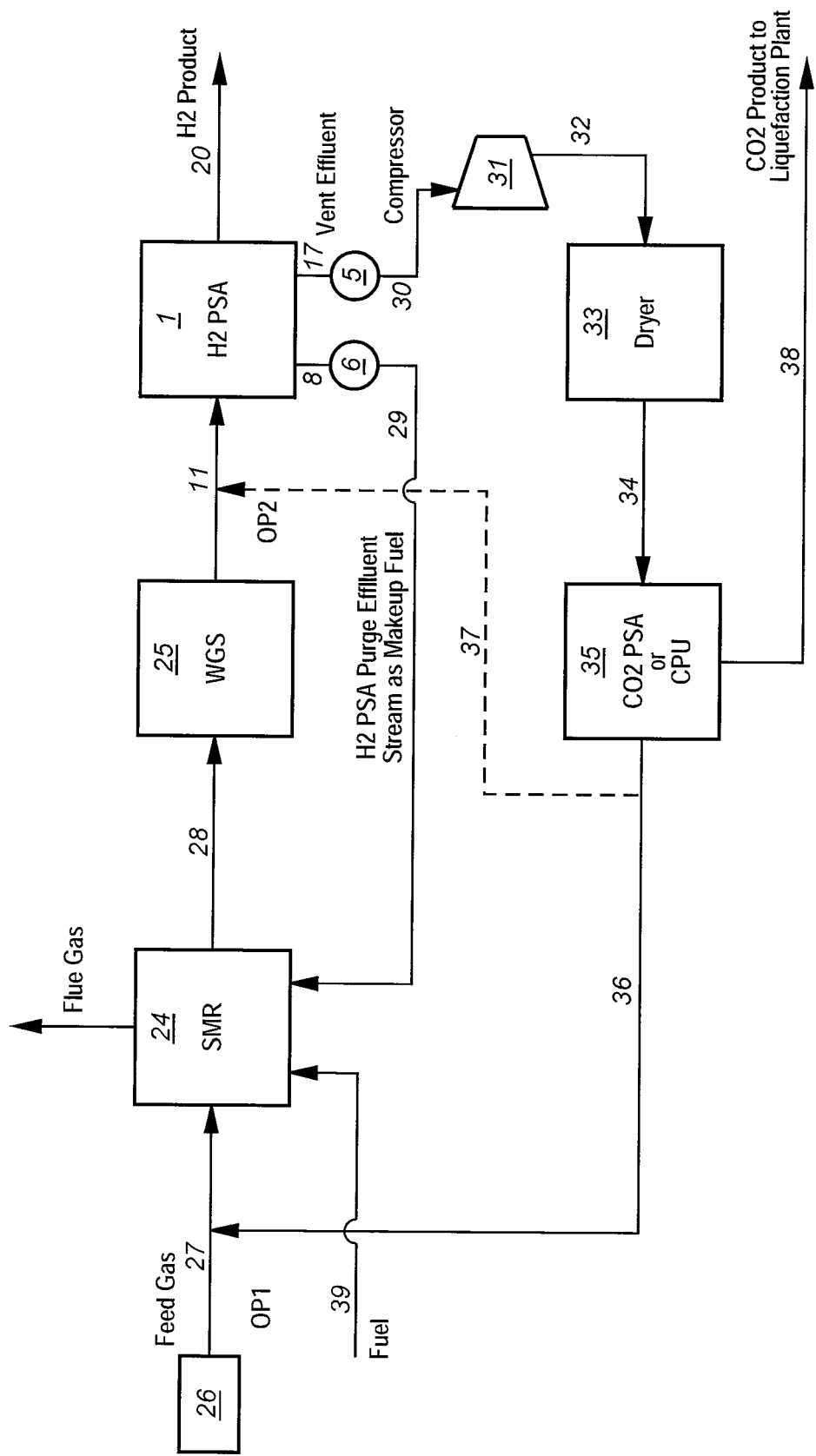
FIG. 4 provides a schematic of the embodiment depicted in FIG. 1 incorporated into a hydrogen/merchant carbon dioxide production plant that comprises a steam hydrocarbon reformer unit and a water gas shift reactor in addition to the hydrogen pressure swing adsorption unit.

In one preferred embodiment of the present invention as depicted in FIG. 4, the hydrogen rich feed stream that is utilized is obtained from a source that is produced from hydrocarbon feed to a steam hydrocarbon reformer unit 24. The hydrogen rich effluent stream 28 obtained from the treatment in the steam hydrocarbon reformer unit 24 is then sent to water gas shift unit 25 which is then used in conjunction with the hydrogen pressure swing adsorption unit 1 of the present invention. This particular embodiment, as shown in FIG. 4, involves the generation of a hydrogen rich effluent by the treatment of one or more hydrocarbon rich feed streams (preferably natural gas) provided from a source 26 via line 27 in a steam hydrocarbon reformer unit 24 along with fuel 39. As used herein, the phrase "steam hydrocarbon reformer unit" is meant to encompass those processes which are utilized to produce a synthesis gas from hydrocarbon rich feed streams utilizing high temperatures, high pressures, catalyst and steam. Preferably, the steam hydrocarbon reformer unit 24 will be a steam methane reformer unit. However, this embodiment of the present invention is not meant to be limited to a specific steam hydrocarbon reformer unit 24 or the process for carrying out the reaction in the steam hydrocarbon reformer unit 24. Accordingly, any steam hydrocarbon reformer unit 24 known in the art may be used in the process of the present invention. By way of general description, such steam hydrocarbon reformer units 24 typically contain one or more tubes (not shown) packed with a steam hydrocarbon reformer catalyst (typically a nickel catalyst) through which the steam and the hydrocarbon rich feed stream 26 mixture passes. As used throughout with regard to the present invention, the phrase "steam hydrocarbon reformer unit" refers not only to the actual reformer units, but also to all of the additional components (not shown) that typically are considered to make up a steam hydrocarbon reformer, including, but not limited to, one or more components selected from heat exchangers, pre-reformer units, the reformer, tubes with one or more types of catalyst, etc. The reaction product from the steam hydrocarbon reformer unit 24 is principally a hydrogen rich effluent that contains hydrogen, carbon monoxide, methane, water vapor and carbon dioxide in proportions close to equilibrium amounts at elevated temperature and pressure (hereinafter collectively referred to as "hydrogen rich effluent"). Preferably, the steam hydrocarbon reformer unit is a steam methane reformer unit.

With regard to FIG. 4, the second step involves treating the hydrogen rich effluent obtained from the steam hydrocarbon reformer unit 24 in a water gas shift reactor 25. The hydrogen rich effluent produced in the steam hydrocarbon reformer unit 24 contains in addition to hydrogen, other components such as carbon monoxide, carbon dioxide, methane and water vapor. This hydrogen rich effluent is further treated in the water gas shift reactor 25 in order to further enrich the hydrogen content of the hydrogen rich effluent and to also increase the carbon dioxide content in the hydrogen rich effluent by converting a portion of the carbon monoxide present in the effluent to carbon dioxide thereby obtaining a water gas shift effluent. In this embodiment, the hydrogen rich effluent stream is introduced via line 28 into the water gas shift reactor 25 (which can contain a variety of stages or one stage; stages not shown) along with steam to form additional hydrogen and carbon dioxide. As used with regard to the present invention, the phrase "water gas shift reactor unit" refers not only to the water gas shift reactor 25 but also to all of the components which typically make up a water gas shift reactor unit. The combination of a steam hydrocarbon reformer unit 24 and a water gas shift reactor 25 and the conditions under which each is run are well known to those skilled in the art.

The water gas shift effluent (which serves as the pretreated hydrogen rich feed stream as described hereinbefore) obtained from the water gas shift reactor 25 is subjected to treatment in the hydrogen pressure swing adsorption unit 1 as described hereinbefore thereby yielding a carbon dioxide lean gas stream which is directed to desorption tank 6 via line 8 and a carbon dioxide enriched gas stream which is directed to desorption tank 5 via line 7. The water gas shift effluent is injected via line 11.

With regard to this embodiment of the invention, the carbon dioxide lean gas stream stored in desorption tank 6 can be directed via line 29 to be used as makeup fuel in the steam hydrocarbon reformer unit 24.

The carbon dioxide rich desorbed steam obtained from the first desorption tank 5 is passed along line 30 to a state of the art compressor 31 where it is compressed (see FIG. 4). Depending upon the concentration of the carbon dioxide in the carbon dioxide rich desorbed stream, the compressed carbon dioxide rich desorbed stream (when the concentration is less than 70 mole %) may be further treated to further concentrate the carbon dioxide by passing the compressed stream via line 32 to a dryer 33 (optional) and then via line 34 to a carbon dioxide pressure swing adsorption unit 35 in order to obtain a carbon dioxide product having a purity greater than 98 mole %. This product is then passed on to a liquefaction plant via line 38 to produce a product that is acceptable for food/beverage grade carbon dioxide (merchant carbon dioxide). Note that with regard to the carbon dioxide pressure swing adsorption, a "tail gas" is also obtained after the carbon dioxide is withdrawn. As shown in FIG. 4, this tail gas can be recycled as additional feed via line 36 or recycled to be added to the water gas shift effluent via line 37. When the carbon dioxide concentration in the carbon dioxide rich desorbed stream is equal to or greater than 70 mole %, the compressed carbon dioxide rich desorbed stream may be passed via line 32 to remove water in a dryer 33 before being passed directly to a cryogenic purification unit 35 via line 34 in order to obtain a carbon dioxide product having a purity that is acceptable for food/beverage grade carbon dioxide (merchant carbon dioxide).

In a still further preferred embodiment of the present invention (not shown), the hydrogen rich feed stream that is utilized is obtained from a coal gasification unit and water gas shift reactor in conjunction with the hydrogen pressure swing adsorption unit of the present invention. As used herein, the phrase "gasification unit" refers to any gasification unit known in the art which is capable of processing hydrocarbon fuel sources in order to produce a gasification effluent stream that contains at least hydrogen and carbon dioxide. The present invention is not meant to be limited by such gasification units. With regard to this particular embodiment, the hydrocarbon fuel source refers to any solid or liquid fuel or solid or liquid fuel source which is derived from organic materials such as refinery residue materials (for example, tar, heavy oils, petcoke, coke) or coke or biofuels (for example, wood, peat, corn, corn husks, wheat, rye and other grains). Preferably the hydrocarbon fuel sources are selected from refinery residues, coal and biofuels. Gasification units such as those proposed for the present embodiment are readily known to those skilled in the art. With regard to the gasification units, the desired effluent stream is one that contains hydrogen and carbon dioxide as these are the ultimate products. However, depending upon the original hydrocarbon fuel source utilized, the final gasification effluent stream produced in the gasification units may include a variety of other components such as, but not limited to, CO, sulfur containing compounds and nitrogen containing compounds in the effluent that is produced in the gasification unit. The remaining steps of the process of this particular embodiment are carried out in the same manner as noted with regard to the first preferred embodiment noted above.

ELEMENTS 1 hydrogen pressure swing adsorption unit
2 hydrogen rich feed stream source
3 adsorption beds
4 adsorbent
5 first desorption tank
6 second desorption tank
7 line for first desorption tank
8 line for second desorption tank
9 first desorption tank valve
10 second desorption tank valve
11 input line for hydrogen rich feed stream
12 output line for high purity hydrogen stream
13 adsorption phase
14 a co-current depressurization phase 15 a counter current depressurization phase
16 a purge at low pressure phase
17 a repressurization phase
18 adsorption bed flow reversible first conduit
19 adsorption bed flow reversible second conduit
20 high purity hydrogen stream line
21 line that connects the various adsorption beds
21.1 line connecting the bed to be co-currently depressurized with the bed to be equalized/repressurized
21.2 line that connects the bed to be co-currently depressurization with the bed to be purged
21.3 line that connect the adsorption bed to the bed to be repressurized
22 valve on line 12
23 valve to control flow reversible first conduit of the adsorption bed
24 steam hydrocarbon reformer unit
25 water gas shift reactor
26 hydrogen rich feed stream source
27 line for injecting hydrogen rich feed stream
28 line for passing hydrogen rich effluent from the steam hydrocarbon reformer to the water gas shift unit
29 recycle line for carbon dioxide lean fraction
30 line from first desorption tank to the compressor
31 compressor
32 line from compressor to the dryer
33 dryer
34 line from dryer to carbon dioxide pressure swing adsorption unit/cryogenic purification unit
35 carbon dioxide pressure swing adsorption unit/cryogenic purification unit
36 recycle line
37 recycle line
38 carbon dioxide product line
39 fuel

What is claimed is:

1. A process for producing a concentrated carbon dioxide stream for use in the production of merchant carbon dioxide during the regeneration of adsorbent and production of a carbon dioxide containing tail gas in an adsorption bed of a hydrogen pressure swing adsorption unit cycle, the process comprising fractionating the carbon dioxide containing tail gas produced during regeneration of the adsorbent in the adsorption bed by counter-currently depressurizing the adsorption bed to desorb a carbon dioxide adsorbed to the adsorbent of the adsorption bed thereby forming a carbon dioxide rich fraction which is withdrawn from the adsorption bed and passed to a first desorption tank followed by purging the adsorption bed to allow for displacement of any residual carbon dioxide from the adsorbent thereby forming a carbon dioxide lean fraction which is withdrawn from the purged first adsorption bed and passed to a second desorption tank, wherein the concentration of carbon dioxide in the carbon dioxide rich fraction is greater than 60 mole %, and wherein during counter-current depressurization, the adsorption bed is reduced to a pressure that ranges from about ambient pressure to about 15 psig.

2. A process for producing a concentrated carbon dioxide stream for use in the production A process for recovering a concentrated carbon dioxide stream during a hydrogen pressure swing adsorption unit cycle, the concentrated carbon dioxide stream to be used in the production of merchant carbon dioxide, the process comprising:

subjecting a hydrogen rich feed stream to the cycle of treatment in the hydrogen pressure swing adsorption unit in order to produce a high purity hydrogen stream, a carbon dioxide rich fraction and a carbon dioxide lean fraction, the hydrogen pressure swing adsorption unit including at least two adsorption beds, with each bed running on a cycle that includes the phases of (1) adsorption, (2) co-current depressurization that includes equalization depressurization and depressurization to purge, (3) countercurrent depressurization, (4) purge, and (5) repressurization that includes equalization repressurization and finalizing repressurization, the two or more adsorption beds operating continuously and in a staggered scheme, with each of the adsorption beds including one or more adsorbents for carbon dioxide and for the components carbon monoxide, methane, and trace amounts of water; wherein during the cycle of treatment in the hydrogen pressure swing adsorption unit:

i) a first adsorption bed which has been subjected to the adsorption phase is co-currently depressurized by allowing an effluent stream from the first adsorption bed to flow to a second adsorption bed that is in the repressurization phase until near equalization in pressure between the first adsorption bed and the second adsorption bed is reached, then directing the depressurization effluent stream from the first adsorption bed to purge a third adsorption bed that is in the purge phase of the cycle, thereby producing a reduced first adsorption bed;

ii) during the counter-current depressurizing phase of the cycle, counter-currently depressurizing the reduced first adsorption bed to desorb carbon dioxide thereby producing a partially desorbed first adsorption bed and forming a carbon dioxide rich fraction which is withdrawn from the partially desorbed first adsorption bed and passed to a first desorption tank that is in communication with each of the adsorption beds;

iii) during the purge phase of the cycle, purging the partially desorbed first adsorption bed using the depressurization effluent stream from a still further adsorption bed that is in the depressurization phase to allow for the displacement of the residual carbon dioxide and the remaining components from the one or more adsorbents thereby forming a purged first adsorption bed and a carbon dioxide lean fraction which is withdrawn from the purged first adsorption bed and passed to a second desorption tank that is in communication with each of the adsorption beds;

iv) repressurizing the purged first adsorption bed using a depressurization effluent stream from an adsorption bed in the depressurization phase to obtain a partially repressurized first adsorption bed and then further repressurizing the partially repressurized first adsorption bed utilizing a portion of the high purity hydrogen stream from the adsorption phase;

iv) withdrawing the carbon dioxide rich fraction from the first desorption tank and compressing this carbon dioxide rich effluent before sending this compressed carbon dioxide rich fraction to be further treated for the recovery of a merchant carbon dioxide product by either subjecting the compressed carbon dioxide rich fraction to cryogenic purification or to carbon dioxide pressure swing adsorption followed by cryogenic purification; and v) withdrawing the carbon dioxide lean fraction from the second desorption tank and recycling the carbon dioxide lean fraction for further use as a make up fuel.

3. A process for producing a concentrated carbon dioxide stream for use in the production The process of claim 2, wherein the concentration of carbon dioxide in the carbon dioxide rich fraction is greater than 60 mole %.

4. A process for producing a concentrated carbon dioxide stream for use in the production The process of claim 2, wherein the concentration of carbon dioxide in the carbon dioxide rich fraction is from about 60 mole % to about 75 mole %.

5. A process for producing a concentrated carbon dioxide stream for use in the production The process of claim 4, wherein the one or more adsorbents are selected from zeolite, activated carbon and activated alumina.

6. A process for producing a concentrated carbon dioxide stream for use in the production The process of claim 3, wherein at the beginning of the co-current depressurization phase, the adsorption bed is at a pressure from about 200 psig to about 600 psig.

7. A process for producing a concentrated carbon dioxide stream for use in the production The process of claim 6, wherein at the beginning of the repressurization phase, the adsorption bed is at near ambient pressure.

8. A process for producing a concentrated carbon dioxide stream for use in the production The process of claim 6, wherein during the counter-current depressurization phase of the cycle, the first adsorption bed is reduced to a pressure that ranges from about ambient to about 15 psig.

9. A process for producing a concentrated carbon dioxide stream for use in the production The process of claim 2, wherein the second desorption tank is smaller in size than the first desorption tank.

10. A process for producing a concentrated carbon dioxide stream for use in the production The process of claim 2, wherein the hydrogen pressure swing adsorption unit includes from 2 to 12 adsorption beds.

11. A process for producing a concentrated carbon dioxide stream for use in the production A process for recovering high purity gaseous hydrogen and high purity gaseous carbon dioxide from a hydrogen pressure swing adsorption unit, the process comprising:
   a) providing a hydrogen pressure swing adsorption unit that includes:
      1) at least two adsorption beds, with each bed running on a cycle that includes (1) adsorption, (2) co-current depressurization that includes equalization depressurization and depressurization to purge, (3) counter-current depressurization, (4) purge at low pressure, and (5) repressurization that includes equalization repressurization and finalizing repressurization, at least one of the adsorption beds being in a different phase of the cycle compared to at least one of the remaining adsorption beds being utilized, with each of the adsorption beds including one or more adsorbents for carbon dioxide and for the components carbon monoxide, methane, and trace amounts of water;
      2) a flow reversible first conduit for receiving feed for each of the adsorption beds,
      3) a high purity gaseous hydrogen stream flow reversible second conduit for each of the adsorption beds,
      4) a first desorption stream tank connected to the one or more adsorption beds, and
      5) a second desorption stream tank connected to the one or more adsorption beds;
   b) initially increasing the pressure in at least one of the adsorption beds to provide at least one high pressure adsorption bed;
   c) introducing a feed stream containing carbon dioxide, carbon monoxide, methane, hydrogen and trace amount of water into the flow reversible first conduit for receiving feed of at least one of the adsorption beds and allowing the feed stream to pass over the one or more adsorbents in the one or more adsorption beds in order to allow for the adsorption of the carbon dioxide, carbon monoxide, methane, and trace amounts of water and a portion of the hydrogen from the feed stream to the one or more adsorbents and the concentration of the remaining gaseous hydrogen in the feed stream to form a high purity gaseous hydrogen stream;
   d) withdrawing the high purity gaseous hydrogen stream via the corresponding high purity gaseous hydrogen stream flow reversible second conduit and passing this high purity gaseous hydrogen stream on for storage;
   e) during the depressurization phase of the cycle, gradually co-currently depressurizing one or more of the adsorption beds that have been through the adsorption phase by allowing communication with one or more adsorption beds already in the repressurization phase that are at a lower pressure in order to achieve a bed to bed equalization and then further co-currently depressurizing the one or more equalized adsorption beds by withdrawing a depressurization effluent stream from the top of one or more of the equalized adsorption beds and directing this stream to one or more adsorption beds in the purge phase thereby producing one or more reduced adsorption beds;
   f) counter-currently depressurizing the one or more reduced adsorption beds to allow for the desorption from the one or more adsorbents of carbon dioxide and a portion of the remaining components thereby producing one or more depressurized adsorption beds and forming a carbon dioxide enriched desorbed stream which is passed to the first desorbed stream tank via the flow reversible first conduit;
   g) purging the one or more depressurized adsorption beds with the depressurization effluent stream of step e) to allow for the desorption of the residual carbon dioxide and the remaining components from the one or more adsorbents to form a carbon dioxide depleted desorbed stream which is passed to the second desorbed stream tank via the flow reversible first conduit thereby producing one or more purged adsorption beds;
   h) repressurizing the one or more purged adsorption beds by communicating the one or more purged adsorption beds with one or more adsorption beds entering the bed regeneration phase;
   i) completing the repressurization of the one or more purged adsorption beds by injecting a portion of the high purity gaseous hydrogen stream to achieve a pressure that is close to the pressure of the high pressure feed gas stream;
   j) compressing the carbon dioxide enriched desorbed steam in the first desorbed stream tank and sending this compressed carbon dioxide enriched desorbed stream for recovery of high purity of carbon dioxide product; and
   k) recycling the carbon dioxide depleted desorbed stream in the second desorbed stream tank for further use.

12. A process for producing a concentrated carbon dioxide stream for use in the production The process of claim 11, wherein the feed gas to the hydrogen pressure swing adsorption unit is obtained from either a coal gasification unit in combination with a water gas shift unit or a steam hydrocarbon reformer unit in combination with a water gas shift unit.

13. A process for producing a concentrated carbon dioxide stream for use in the production The process of claim 12, wherein the one or more adsorbents are selected from zeolite, activated carbon and activated alumina.

14. A process for producing a concentrated carbon dioxide stream for use in the production The process of claim 13, wherein the hydrogen pressure swing adsorption unit includes from 2 to 12 adsorption beds.

15. A process for producing a concentrated carbon dioxide stream for use in the production The process of claim 12, wherein the concentration of carbon dioxide in the carbon dioxide rich fraction is greater than about 60 mole %.

16. A process for producing a concentrated carbon dioxide stream for use in the production The process of claim 12, wherein at the beginning of the co-current depressurization phase, the adsorption bed is at a pressure from about 200 psig to about 600 psig.

17. A process for producing a concentrated carbon dioxide stream for use in the production The process of claim 16, wherein at the beginning of the repressurization phase, the adsorption bed is at near ambient pressure.

* * * * *